(12) United States Patent
Fluhr et al.

(10) Patent No.: US 7,350,029 B2
(45) Date of Patent: *Mar. 25, 2008

(54) DATA STREAM PREFETCHING IN A MICROPROCESSOR

(75) Inventors: Eric Jason Fluhr, Round Rock, TX (US); Bradly George Frey, Austin, TX (US); John Barry Griswell, Jr., Austin, TX (US); Hung Qui Le, Austin, TX (US); Cathy May, Millwood, NY (US); Francis Patrick O'Connell, Austin, TX (US); Edward John Silha, Austin, TX (US); Albert Thomas Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 280 days.

This patent is subject to a terminal disclaimer.

(21) Appl. No.: 11/054,889

(22) Filed: Feb. 10, 2005

(65) Prior Publication Data

US 2006/0179239 A1 Aug. 10, 2006

(51) Int. Cl.
*G06F 12/00* (2006.01)
*G06F 13/00* (2006.01)
(52) U.S. Cl. .................. 711/137; 711/100; 711/154
(58) Field of Classification Search ............. 711/100, 711/137, 154
See application file for complete search history.

(56) References Cited

U.S. PATENT DOCUMENTS

| 5,276,848 | A | * | 1/1994 | Gallagher et al. ........ 711/121 |
| 5,958,040 | A | | 9/1999 | Jouppi |
| 5,983,306 | A | | 11/1999 | Corrigan et al. |
| 6,085,291 | A | | 7/2000 | Hicks et al. |
| 6,317,811 | B1 | | 11/2001 | Deshpande et al. |
| 6,460,115 | B1 | | 10/2002 | Kahle et al. |
| 6,574,712 | B1 | | 6/2003 | Kahle et al. |
| 6,578,130 | B2 | | 6/2003 | Barrick et al. |
| 6,651,245 | B1 | * | 11/2003 | Damron et al. ............. 717/159 |
| 6,785,772 | B2 | | 8/2004 | Venkumahanti et al. |
| 6,981,099 | B2 | * | 12/2005 | Paulraj et al. ............. 711/137 |
| 7,032,076 | B2 | | 4/2006 | Sprangle et al. |

(Continued)

OTHER PUBLICATIONS

"Cache Organization"; ECEN 2120 Lecture Notes; University of Colorado at Boulder; 1999; pp. 1-6; http://web.archive.org/web/19991103235721/http://ece-www.colorado.edu/~ecen2120/Manual/caches/cache.html.

*Primary Examiner*—Tuan V. Thai
(74) *Attorney, Agent, or Firm*—Dillon & Yudell LLP

(57) ABSTRACT

A method of prefetching data in a microprocessor includes identifying a data stream associated with a process and determining a depth associated with the data stream based upon prefetch factors including the number of currently concurrent data streams and data consumption rates associated with the concurrent data streams. Data prefetch requests are allocated with the data stream to reflect the determined depth of the data stream. Allocating data prefetch requests may include allocating prefetch requests for a number of cache lines away from the cache line currently being referenced, wherein the number of cache lines is equal to the determined depth. The method may include, responsive to determining the depth associated with a data stream, configuring prefetch hardware to reflect the determined depth for the identified data stream. Prefetch control bits in an instruction executed by the processor control the prefetch hardware configuration.

7 Claims, 6 Drawing Sheets

U.S. PATENT DOCUMENTS 7,177,985 B1* 2/2007 Diefendorff .................. 711/137
2003/0088863 A1* 5/2003 Tirumalai et al. ............ 717/158
2004/0022094 A1* 2/2004 Radhakrishnan et al. ... 365/200
2006/0095677 A1 5/2006 Hakura et al.

* cited by examiner

DCBT INSTRUCTION

| START ADDRESS 602 | DIR 604 | LENGTH 606 | DEPTH 608 | STREAM ID 610 |

600

DATA STREAM PREFETCHING IN A MICROPROCESSOR

RELATED APPLICATIONS

The following concurrently pending applications disclose related subject matter: *Store Stream Prefetching in a Microprocessor*, Ser. No. 11/054,871, filed Feb. 10, 2005 and *Data Stream Prefetching in a Microprocessor*, Ser. No. 11/054,889, filed Feb. 10, 2005.

BACKGROUND

1. Field of the Present Invention

The present invention is in the field of microprocessors and, more particularly, processors that employ data prefetching.

2. History of Related Art

Hardware data prefetchers have been used in recent microprocessors to anticipate and mitigate the substantial latency associated with retrieving data from distant caches and system memory. This latency, which is the total number of processor cycles required to retrieve data from memory, has been growing rapidly as processor frequencies have increased faster than system memory access times.

Stream hardware data prefetchers have been used to detect data streams. A stream may be defined as any sequence of storage accesses that reference a contiguous set of cache lines in a monotonically increasing or decreasing manner. In response to detecting a data stream, hardware prefetchers are configured to begin prefetching data up to a predetermined number of cache lines ahead of the data currently being processed.

Prior art stream prefetch mechanisms include support for software instructions to direct or control certain aspects of the prefetch hardware including instructions to define the beginning and the end of a software stream, when prefetching should be started, and the total number of outstanding L2 prefetches allowed at any time. While these instructions are useful, the most effective depth of prefetching in a high latency multi-processor system depends upon a number of factors such as the number of other streams currently being prefetched and the rate of consumption of each of those streams by the executing software programs. For example, the optimal prefetch depth in an environment where multiple code sequence are interleaving the access to ten streams at equal consumption rates would be smaller than the optimal depth for code that is accessing only one data stream, but with a much higher consumption rate. For the latter case, if the prefetch request rate is too low (i.e., the prefetch depth is too low), the performance of the code will be sub-optimal due to the exposed latency of not prefetching far enough ahead. As another example, a code sequence that includes two streams where one stream has a much higher consumption rate than the other stream will be difficult to optimize in conventional prefetching hardware that does not permit dynamic and stream-by-stream prefetch control. It would be desirable, therefore, to implement a microprocessor that included stream dependent prefetch control.

SUMMARY OF THE INVENTION

The identified objective is achieved with a method of prefetching data in a microprocessor that includes identifying a data stream associated with a process and determining a depth associated with the data stream based upon prefetch factors including the number of concurrent data streams and data consumption rates associated with the concurrent data streams. Data prefetch requests are allocated with the data stream to reflect the determined depth of the data stream. Allocating data prefetch requests may include allocating prefetch requests for a number of cache lines away from the cache line currently being referenced, wherein the number of cache lines is equal to the determined depth. The method may include, responsive to determining the depth associated with a data stream, configuring prefetch hardware to reflect the determined depth for the identified data stream. Prefetch control bits in an instruction executed by the processor control the prefetch hardware configuration.

The invention also encompasses a microprocessor that includes an execution unit for processing load and store instructions, and prefetch hardware coupled to the execution unit and configured to receive addresses generated by the execution unit. The prefetch hardware is configured to allocate prefetch requests responsive to receiving the generated addresses. The prefetch hardware includes configurable bits that control the depth of prefetch requests to be allocated responsive to receiving a generated address. The prefetch hardware is configured to use a first depth to control the depth of prefetch requests associated with addresses generated associated with a first data stream and to use a second depth to control the depth of prefetch requests associated with a second data stream. The depth determines the number of cache lines away from the cache line currently being referenced to be prefetched. The configurable bits are controlled by a field of bits in an instruction executed by the processor. A field of prefetch control bits in a data cache block touch instruction controls the configurable bits. The processor may be configured to allocate one or more prefetch requests responsive to receiving an address associated with a cache line that is not valid in an L2 cache of the processor.

BRIEF DESCRIPTION OF THE DRAWINGS

Other objects and advantages of the invention will become apparent upon reading the following detailed description and upon reference to the accompanying drawings in which.

Figure 1:
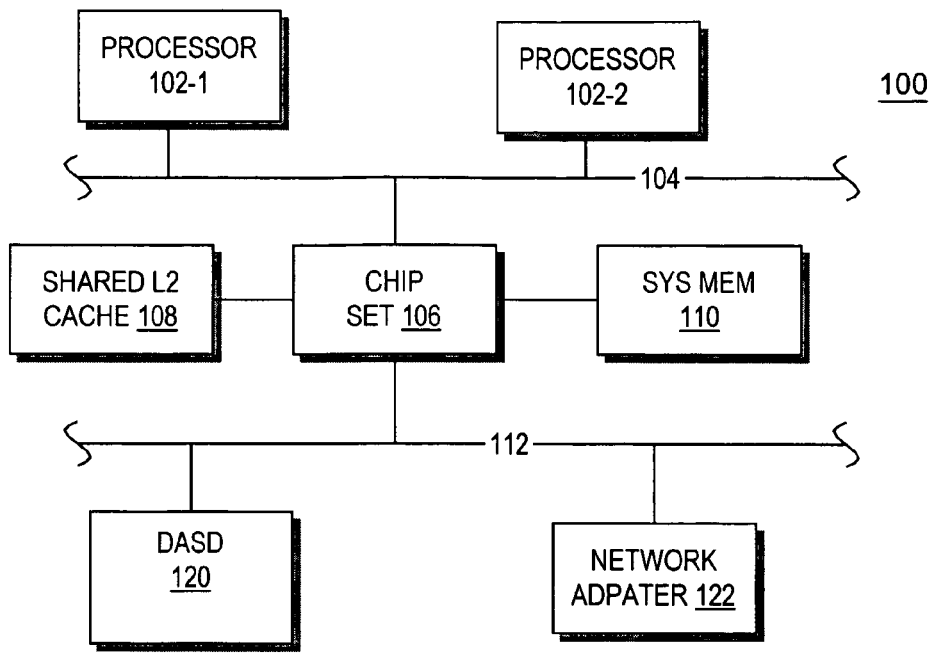
FIG. 1 is a block diagram of selected elements of a multi-processor data processing system.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking the invention encompasses a system and method for prefetching data in a microprocessor-based data processing system. When a compiler identifies a data stream in a program, the compiler also determines or estimates the data stream environment as part of its compilation analysis. The data stream environment includes the number of concurrent data streams and the relative data consumption rates of the concurrent data streams for the relevant portion of the program. The relative data consumption rate is affected by, for example, the logic of the program and the micro-architectural characteristics of the data processing system.

Using the data stream environment information, the compiler may insert prefetch instruction(s) into the object code of a program. The prefetch instructions, when executed, modify registers within the data prefetching hardware that define the data streams and control the manner in which the prefetch hardware issues prefetches for these data streams. As an example, the data prefetching hardware may implement or support variable stream depths. The depth of a stream represents how aggressively data are prefetched. Aggressive prefetching may fetch many lines ahead of the cache line currently being referenced whereas more moderate prefetching may fetch only a few lines ahead.

Thus, one aspect of the invention encompasses a compiler that is able to recognize data streams in source code and to include object code instructions that modify the system's prefetch characteristics based on data stream characteristics. A microprocessor according to the present invention includes prefetching hardware necessary to execute the compiler-generated instructions. Preferably, the prefetch hardware supports prefetching for multiple, concurrent data streams where each data stream may have a corresponding prefetching depth.

In addition to the dynamic prefetch control mechanisms, the present invention further includes a method and system for handling store instructions and, more specifically, identifying and prefetching store streams, especially in the context of a memory hierarchy in which store instructions are not allocated in the primary level of cache (L1). This aspect of the invention provides a cost effective mechanism for detecting and prefetching store streams in a store-through cache design that does not allocate store data in the L1 cache on a store miss. This same method is applicable to detecting load streams as well. The mechanism also allows for prefetch parameters such as prefetch depth to be controlled via store prefetch instructions analogous to the prefetch parameters for load streams.

Turning now to the drawings, FIG. 1 is a block diagram of selected elements of a data processing system 100 including microprocessors 102-1 and 102-2 according to one embodiment of the invention. Microprocessors 102-1 and 102-2 (generically or collectively referred to as processor(s) 102) are connected to a shared system bus 104. A chip set 106 provides an interface between host bus 104, a system memory 110, and a shared L2 cache memory 108. Microprocessors 102 also include L1 internal caches that are not depicted in FIG. 1.

Chip set 106 also provides a bridge between host bus 104 and a peripheral or I/O bus 112. Peripheral bus 112 accommodates various peripheral devices including, as examples, a direct access storage device (DASD) 120, also referred to as a hard disk, and a network adapter 122 that enables a connection between system 100 and an external network (not depicted). Although the implementation of system 100 depicted in FIG. 1 is representative, other implementation are possible. For example, the number of processors 102 in system 100 may be greater than two, the peripheral devices may vary, the number of cache levels may be greater than two, and so forth.

Figure 2:
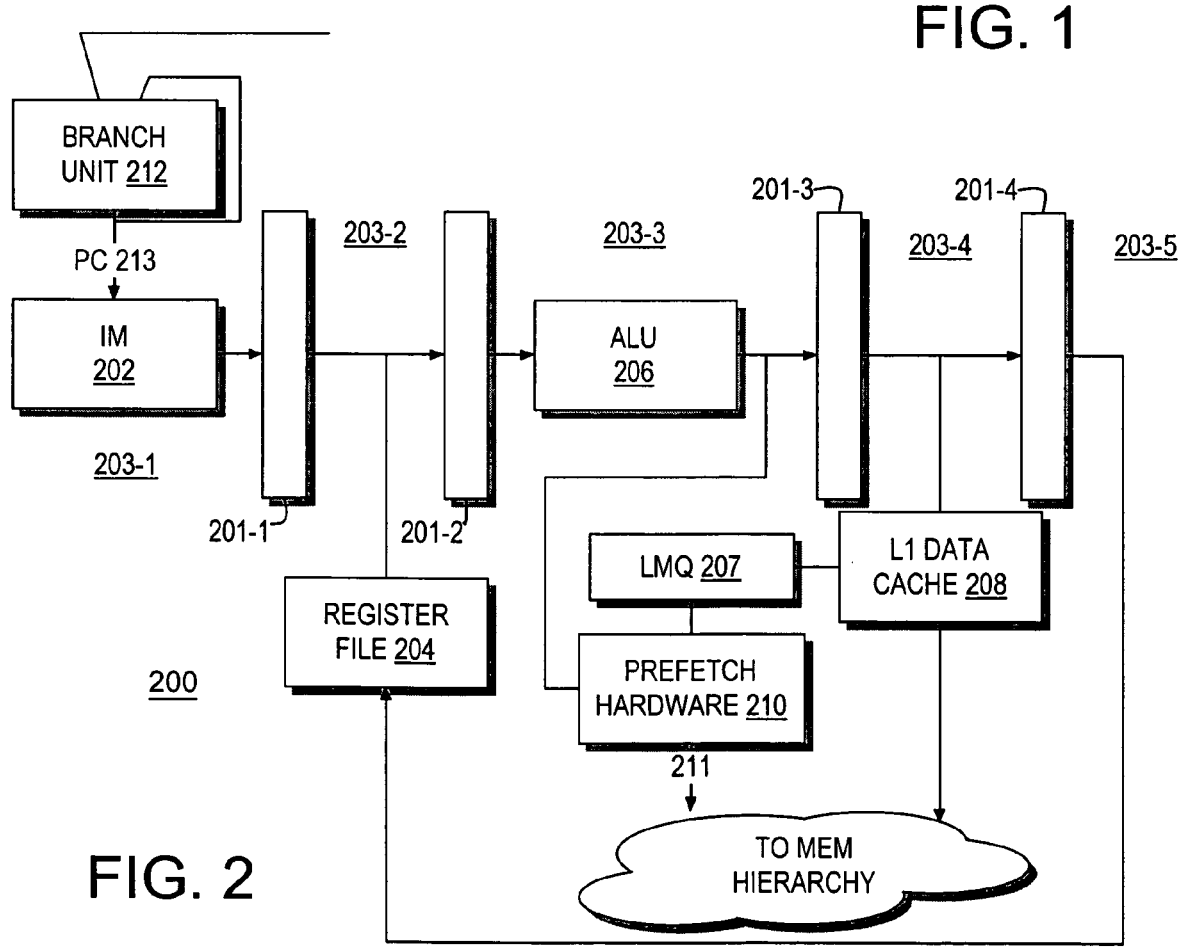
FIG. 2 is a block diagram of selected elements of a load/store unit according to an embodiment of the invention.

Turning now to FIG. 2 selected elements of a processor 102 suitable for use in system 100 according to the present invention are depicted. The elements of processor 102 depicted in FIG. 2 emphasize components of a load/store unit (LSU) 200 according to an embodiment of the invention. In the depicted embodiment, LSU 200 is a pipeline execution unit for retrieving data from and storing data to the system's memory hierarchy. As a pipelined unit, LSU 200 is shown as including a series of latches 201-1 through 201-4 (generically or collectively referred to herein as latch(es) 201). Latches 201 define stages of LSU 200. The simplified representation of LSU 200 includes stages 203-1 through 203-5 (stage(s) 203).

Stage 203-1 is an instruction fetch stage in which a program counter (PC) 213 is provided to an instruction cache or instruction memory (IM) 202. A branch unit 212 that determines or predicts the address of the next instruction to execute provides the PC 213. Stage 203-2 is an instruction decode stage in which values in the registers referenced by the instruction are retrieved from a register file 204.

In an execution stage 203-3, an ALU 206 produces a value based on the register values retrieved in decode stage 203-2. In the context of a load or store instruction, ALU 206 produces an address for the load or store instruction. In practice, an additional translation stage may exist to translate this address from one type to another, e.g. from an effective address to a real address through a table containing translations. In the memory access stage 203-4 the address generated in execution stage 203-3 is used to access an L1 data cache 208 to retrieve (in the case of a load) data from the memory (assuming that the address hits in the L1 data cache 208). Finally, for load instructions, data retrieved from L1 data cache 208 is written back to register file 204 in the write back stage 203-5. For store instructions, the address produced by the ALU for the store data are buffered in a store queue until the data are produced. Store data may be produced by a previous load instruction or by other execution pipelines in the microprocessor, for example, a floating-point arithmetic pipeline. In any event, the store instruction cannot be completed until the data to be stored are available and placed in the store queue. The stages depicted in FIG. 2 are representative of an exemplary embodiment. The precise number of boundaries of the stages in LSU 200 is an implementation detail.

Execution of a load instruction proceeds efficiently (i.e., memory latency is not a concern) as long as the address generated by ALU 206 "hits" in the L1 data cache 208. If an address misses in cache 208, however, potentially significant latency penalties result. A latency penalty refers to the number of processor cycles required to retrieve data from the memory hierarchy. In an effort to avoid or minimize latency penalties, LSU 200 includes prefetch hardware 210 according to the present invention.

As depicted in FIG. 2, prefetch hardware 210 receives addresses generated by ALU 206. In addition, prefetch hardware has access to a load miss queue (LMQ) 207. LMQ 207 stores addresses associated with load instructions or L1 prefetches that have missed in L1 cache 208. Store instructions that miss in the L1 cache do not generate L1 prefetch requests. Prefetch hardware 210 is configured to review addresses it receives from LSU 200 and to initiate prefetch requests (represented by reference numeral 211) to the memory hierarchy based upon those addresses.

Figure 3:
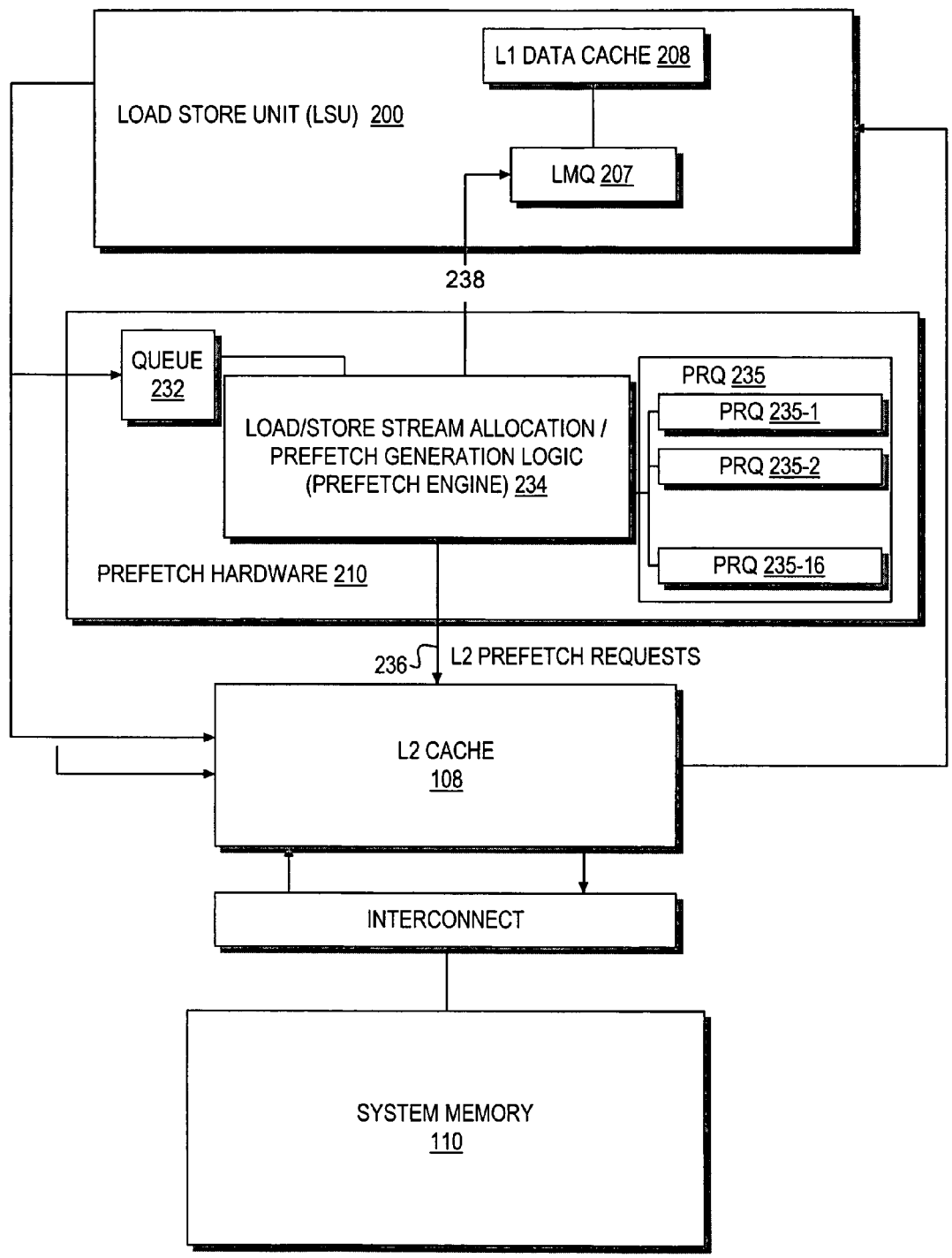
FIG. 3 is a block diagram showing additional detail of a processor of FIG. 1.

Referring now to FIG. 3, additional detail of an embodiment of the prefetch hardware 210 of FIG. 2 is shown. As depicted in FIG. 3, prefetch hardware 210 includes a queue 232 that buffers addresses generated by LSU 200. Queue 232 provides buffered address to circuitry referred to herein as stream allocation and prefetch generation engine 234 (prefetch engine 234). Prefetch engine 234 is responsible for controlling a prefetch request queue (PRQ) 235 to generate L2 prefetch requests 236 and L1 prefetch requests 238. In some embodiments, L1 prefetch requests are issued for load streams only. Prefetch engine 234 controls the allocation of a set of PRQ entries 235-1 through 235-16 (also referred to as stream registers 235-1 through 235-16). Generally speaking, prefetch hardware 210 monitors address generation from LSU 200 with the intention of (1) identifying new data streams and (2) advancing the state of existing data streams. When LSU 200 generates an address, prefetch hardware 210 receives the address. If the address matches any of the addresses in stream registers 235-1 through 235-16, the state of the corresponding prefetch stream is advanced (including sending any prefetch requests and updating the address in the stream register).

If an address generated by LSU 200 does not match an address in any of the stream registers 235-1 through 235-16, prefetch hardware 210 determines whether a new data stream should be created, and if so, which stream register should receive the new stream assignment. (An LRU algorithm is preferably employed to select the stream register to be overwritten with the new stream assignment.) A new stream is "created" by storing an address in the selected stream register. For load instructions, a new stream is created if two conditions are met: (1) the load instruction missed in the L1 cache and (2) the address associated with the load instruction (or, more specifically, the address of the cache line associated with the data address of the load instruction) is not found in any entries of LMQ 207, which absence is an indication that a reload request or L1 prefetch has not yet been sent for that line.

For store instructions, as described further below with respect to FIG. 7 and FIG. 8, different criteria are used to allocate and initiate new streams. The addresses in PRQ 235 are compared to a window of addresses. The address window is a set of contiguous addresses derived from the store address. If any entries in PRQ 235 are within the address window, a new stream allocation is suppressed. This store prefetch allocation policy is more conservative than the policy for loads since the store prefetch policy inhibits new streams when the address is within a window of multiple addresses. This store prefetch policy, which is motivated by the lack of an appropriate miss signal for store data and the lack of an LMQ analogy for stores, is required to prevent the creation of duplicate store prefetch streams. Allocation of new streams for store instructions is described in greater detail below with respect to FIG. 7 and FIG. 8.

As their names imply, L2 and L1 prefetch requests 236 and 238 cause data from the memory subsystem to be fetched or retrieved into L2 cache 108 and (for loads) L1 cache 208 respectively, preferably before the data are needed by LSU 200. The concept of prefetching recognizes that data accesses frequently exhibit spatial locality. Spatial locality suggests that the address of the next memory reference is likely to be near the address of recent memory references. A common manifestation of spatial locality is a data stream, in which data from a block of memory are accessed in a monotonically increasing (or decreasing) sequence such that contiguous cache lines are referenced by at least one instruction. When prefetch hardware detects a data stream (e.g., references to addresses in adjacent cache lines), it is reasonable to predict that future references will be made to addresses in cache lines that are adjacent to the current cache line (the cache line corresponding to currently executing memory references) following the same direction. Prefetching hardware causes a processor to retrieve one or more of these adjacent cache lines before the program actually requires them. As an example, if a program loads an element from a cache line (this cache line will referred to as "cache line n") and then loads an element from cache line n+1, the prefetching hardware may prefetch cache lines n+2 and n+3, anticipating that the program will soon load from those cache lines. Skilled practitioners will also recognize that the methods and techniques described can easily be generalized to apply to streams with stride greater than 1 (i.e., streams in which the sequence of cache line references is n, n+S, n+2S, n+3S, etc., where S>1 or S<−1).

Prefetching can be aggressive or conservative. The aggressiveness of an implementation's prefetching is reflected in the depth of a prefetch. Prefetch depth refers to the number of cache lines prefetched ahead of the cache line currently being loaded from or stored into by the program. For purposes of this disclosure, aggressive prefetching refers to prefetching a relatively large number of adjacent cache lines ahead of the current cache line and conservative prefetching refers to prefetching a relatively small number of adjacent cache lines ahead of the current cache line. Ideally, the depth of a prefetch implementation is optimized so that a sufficient number of cache lines is being prefetched to avoid a cache miss latency penalty while, at the same time, not causing excessive prefetching.

Excessive prefetching refers to prefetching more cache lines than are necessary given the current rate of data "consumption", or the maximum data bandwidth available to the processor. With excessive prefetching, scarce cache memory is filled with data that will not be used in the near future. In addition, excessive prefetching may cause cache lines that hold valid data to be displaced before they are used. Also, excessive prefetching can overload memory request queues causing command retries, consuming excess address bandwidth and thus reducing the effective bandwidth of the system.

The optimal number of outstanding prefetches is primarily a function of memory latency and the bandwidth available to the processor. If, for example, the latency is X cycles and the bandwidth provides a transfer from memory to the processor of one line in Y cycles, then X/Y is the optimal number of outstanding requests. In other words, if there are always at least X/Y requests outstanding to memory, the full bandwidth of the system can be utilized without any gaps caused by latency, provided the design of the memory subsystem is so designed. As indicated previously, however, the optimized depth for a data stream depends on a potentially complex set of factors. The optimum prefetch depth for one data stream may not be the same as the optimum depth for another stream. Moreover, the optimum depth for any data stream may vary with the number of concurrent data streams and other factors. Prefetch hardware 210 according to the present invention supports dynamic and stream-specific control over prefetch parameters including the prefetch depth.

Figure 4:
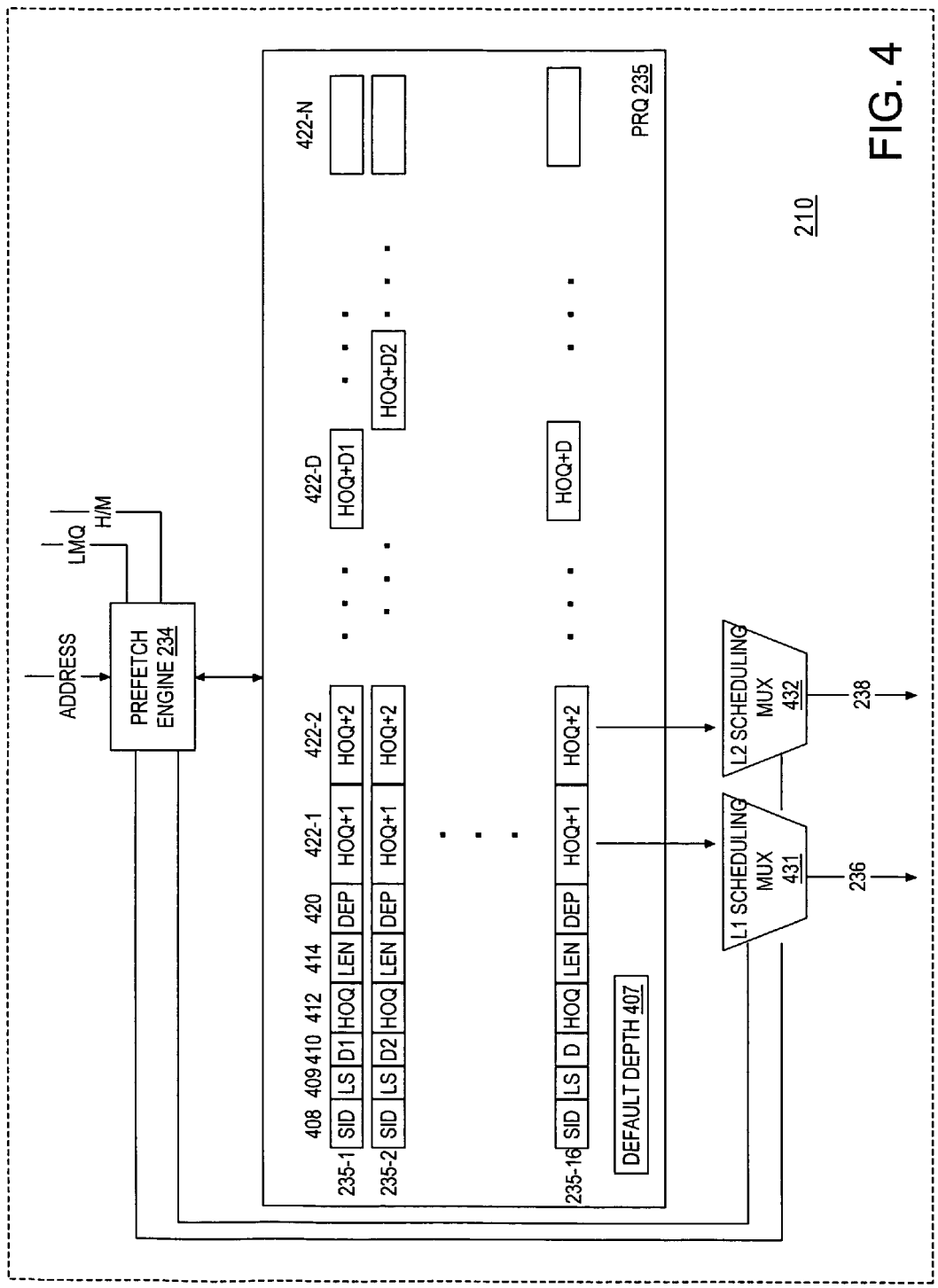
FIG. 4 is a block diagram showing selected elements of prefetch hardware according to one embodiment of the invention.

Referring now to FIG. 4, additional detail of prefetch hardware 210 of FIG. 3 according to one embodiment of the invention is depicted. In the depicted embodiment, each stream register 235-1 through 235-16 of PRQ 235 contains information that describes attributes of the corresponding data stream. In the depicted embodiment, each stream register 235-1 through 235-16 includes a stream identification field (SID) 408, a load/store (LS) field 409, an up/down bit 410 (D), a head of queue (HOQ) address 412, a length (LEN) field 414, and a depth (DEP) field 420. Length field 414 and the HOQ 412 define the boundaries of the data stream. When a stream is first allocated, HOQ 412 contains the address of the first cache line in the stream. The depth field 420 indicates the level of prefetching associated with the corresponding data stream (e.g., aggressive or conservative).

Prefetch engine 234 receives addresses generated by the LSU 200 (FIG. 2). The received memory address is associated with a cache line in memory. LSU 200 generates addresses associated with memory references. When one of these addresses misses in the L1 data cache, if the address does not match any of the PRQ entries 235 and the other load or store conditions for creating a new stream are met, prefetch engine 234 will guess whether the stream is an incrementing stream or a decrementing stream. This determination could be made based upon the memory address's position within its cache line or based upon some other factor. If prefetch engine 234 guesses an incrementing stream, prefetch engine 234 increments the memory address received from LSU 200 and stores the incremented address in the HOQ field 412 of one of the stream registers 235 of prefetch request queue 235. For the remaining discussion, all examples will assume streams that are ascending, although descending streams are handled in an analogous manner. (It should be noted that incrementing and decrementing in this context refers to incrementing and decrementing the cache line portion of an address. If, for example, a cache line includes 128 bytes, incrementing the memory address refers to incrementing along 128-byte boundaries).

If and when a subsequent load/store references this incremented address, prefetch engine 234 receives the address and discovers that the address matches an entry in PRQ 235. At this point, a stream has been confirmed and prefetch hardware 210 will service or advance the corresponding stream.

Each entry in PRQ 235 as depicted in FIG. 4 includes a set of N prefetch request entries 422-1 through 422-N that can hold a prefetch request for a particular address. Prefetch engine 234 is responsible for consulting the depth field 420 of each stream and generating prefetch requests up to and including D lines ahead of the HOQ address.

Thus, as depicted in FIG. 4, stream register 235-1 is shown as having a depth field value D1 while stream register 235-2 has a depth field value D2. Correspondingly, prefetch requests have been generated and placed in prefetch request entries 422-1 through 422-D1 of stream register 235-1 while prefetch requests have been generated and stored in prefetch request entries 422-1 through 422-D2 of stream register 235-2. This illustration emphasizes the ability to customize the depth of each prefetch stream. As soon as prefetch requests are generated and placed in any of the prefetch request entries 422-1 through 422-N, they are available to be sent to the L2 cache. As prefetch requests are scheduled, they are removed from 422.

When an address generated by LSU 200 matches an entry in any of the HOQ fields 412, prefetch engine 234 services the matching stream by incrementing HOQ field 412, and by generating additional prefetch requests, provided the stream has not reached the last line. The length field 414 is updated upon each HOQ match to reflect the remaining length of the data stream, and prefetches are never generated for lines which extend beyond the last line of the data stream.

Prefetch hardware 210 includes prefetch scheduling multiplexers 431 and 432, which gate L1 and L2 prefetch requests respectively. Prefetch engine 234 controls mux's 431 and 432 to select a prefetch instruction from one of the sixteen entries, usually in a round-robin fashion. In the depicted embodiment, prefetch requests in prefetch request entries 422-1 are issued as L1 prefetches while prefetch requests in prefetch request entries 422-2 are issued as L2 prefetches. When a prefetch request from any of the entries 422-2 is issued, any and all requests that exist in entries 422-3 through 422-N are shifted left one position. New prefetch requests are filled in from left to right starting with the first empty prefetch request entry. When any of the data streams 435-1 through 435-16 reach a steady state, the prefetch request for line HOQ+Di will be in entry 422-2 and all entries to its right will be empty. In this state, an address generated by LSU 200 matching the entry in HOQ will first increment HOQ by one and then generate a L1 prefetch to HOQ+1, which will be placed in 422-1 of that stream register. It will generate an L2 prefetch to HOQ+Di, which will be placed in 422-2, assuming the end of the stream has not yet been reached. Prefetch engine 234 may consult the LS bit 409 to suppress L1 prefetching for store streams. A caveat here is that each prefetch request may correspond to multiple cache lines. If this is the case, the prefetching depth is preferably constrained to integer multiples of the number of cache lines corresponding to a prefetch request. Thus, if a prefetch request includes four cache lines, the prefetch depth is preferably constrained to cache line multiples of four.

The prefetch depth may be a default prefetch depth. The default prefetch depth may be indicated when, for example, the value in depth field 420 of a stream register 235 is 0. PRQ 235 is shown as including a default depth register 407 that stores a default prefetching depth attribute. In the absence of an individual stream explicitly overriding default depth register 407 (e.g., by writing a non-0 value in depth field 420), the default depth in register 407 controls the prefetch depth for all software defined or hardware detected streams. The default depth may be changed at any time by software so that any new streams initiated after the change will use the new depth. This allows the compiler or application programmer to find the optimum average depth of an application by varying only the default depth and measuring the resultant performance of the application.

As referred to above, prefetch engine 234 is responsible for determining whether to create (allocate) a new stream when an address generated by LSU 200 misses the L1 cache and does not match an HOQ field entry in any stream register 235-1 through 235-16. In the case of load instructions, the prefetch engine then compares the received address with entries in the LMQ 207. Comparing addresses to the LMQ entries is important to avoid creating redundant PRQ entries. Because the HOQ addresses stored in PRQ 235 are incremented (or decremented) relative to the address of the current LSU reference, there is generally no entry in PRQ 235 corresponding to the current cache line. However, an entry for a cache line in the LMQ indicates that a request for said line that missed the L1 cache has already been generated, and therefore a corresponding PRQ entry already exists. It should be noted here that the depicted implementation of processor 102 and LSU 200 does not include a store miss queue or a store miss indicator, and thus there is no comparable technique for creating streams from store address reference patterns. Moreover, implementing a miss queue for an L2 cache which is tens of cycles away from the prefetch engine is extremely difficult. Processor 102 according to the present invention uses a different technique to detect and manage streams corresponding to the target addresses of store instructions. (see FIG. 8 below and supporting text).

Using the stream registers 235, prefetch engine 234 is able to provide customized prefetching for each data stream. Consider the case of two data streams, one having a large value in depth field 420 of its stream register and the other having a small value in its stream register depth field. When the streams are first detected, there are no outstanding prefetch requests associated with either stream. As the program progresses, loading data from the second cache line of each stream, the prefetch engine will begin creating and issuing prefetch requests for the third cache line and beyond. This is the beginning of the prefetch ramp-up stage, wherein the prefetch engine issues a plurality of prefetches over one or more steps as it advances toward the steady state condition of prefetching ahead the number of cache lines designated by its depth field 420. Because the first stream has a deeper depth than the second stream, the prefetch engine 234 will likely initiate more prefetch requests for the first stream than for the second stream. In a simplistic case, for example, prefetch engine 234 may initiate four prefetch requests for a first stream having a depth of eight and two prefetch requests for a second stream having a depth of four. In the absence of individualized parameterization of the prefetch environment for each stream, both streams would receive substantially equal treatment from prefetch engine 234.

As described above with respect to FIG. 4, prefetch engine 234 according to the present invention includes facilities that support stream-dependent prefetching characteristics. In one embodiment, the present invention encompasses a compiler that takes advantage of prefetch engine 234 by identifying data streams in source code and manipulating the fields of the stream registers 235 to direct the prefetch engine to prefetch identified data streams most effectively. A compiler's ability to access the fields of the stream registers 235 is provided by processor supported instructions that alter the contents of the fields of stream registers 235.

Figures 5, 6:
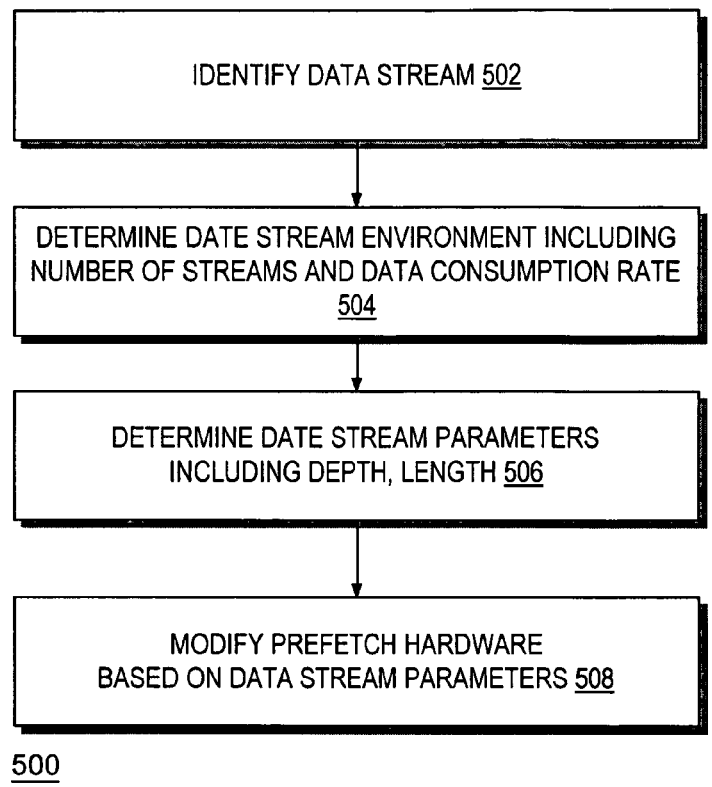
FIG. 5 is a flow diagram of a method of compiling source code to implement the prefetch configuration hardware of FIG. 4.
FIG. 6 is a diagram of a computer executable instruction suitable for use to configure the prefetch hardware of FIG. 4.

Referring to FIG. 5, a conceptual representation of a method 500 for controlling prefetching in a microprocessor according to one embodiment of the invention is depicted as a flow diagram. Method 500 may be implemented via computer executable instructions (software) stored on a computer readable medium. Because these computer executable instructions preferably comprise a portion of a compiler, method 500 is also referred to herein as compiler 500.

In the depicted embodiment, compiler 500 includes identifying (block 502) a data stream. As indicated previously, a data stream is a sequence of storage accesses that reference a contiguous set of cache lines in a monotonically increasing or decreasing fashion. Compiler 500 may identify certain patterns in source code that indicate the presence of one or more data streams. Vector mathematics, for example, may include a repeating series of references to elements in a vector. Each element in the vector may be stored within a contiguous set of cache lines and the vector operation may reference the elements sequentially. For example, source code adding a first one-dimensional vector to another and storing the result in a third vector may include three data streams, one for the first operand, one for the second operand, and one for the result. Data streams often manifest themselves in source code loops (e.g., FOR I=1 to N, DO RESULT(I)=FIRST(I)+SECOND(I)) or in various other ways. Compiler 500 includes functionality to identify the presence of a data stream in computer software code.

The depicted embodiment of compiler 500 includes, in addition to the ability to recognize data streams, the ability to determine (block 504) the environment in which the detected data stream resides. In this context, the data stream environment refers to information including the number of concurrent data streams and the relative data consumption rate of the concurrent data streams. A compiler, for example, may be able to determine the number of data streams that exist within a subroutine such as a matrix math subroutine. Moreover, the compiler may also be able to determine the relative consumption rates of the identified data streams. Within a loop, for example, references to a first vector may occur with twice the frequency of references to a second vector, as in the case of a Fortran array of complex double precision numbers multiplying an array of double precision numbers element by element. In this case, the compiler may be able to determine that the rate at which references to the first vector are issued is twice the rate at which references to the second reference are issued.

Compiler 500 according to the present invention is configured to respond to the identification of one or more data streams and the determination of the data stream environment by determining (block 506) data stream parameters for one or more of the detected data streams. The data streams parameters include, for example, the beginning of a data stream, the direction, the length, and the depth. As discussed previously, the depth corresponds to the amount or level of prefetching desirable for the corresponding data stream. A depth of 8, for example, indicates that the prefetch hardware should prefetch eight cache lines ahead of the cache line currently being referenced by the program to avoid significant latency delays.

Compiler 500 further includes the ability to modify (block 508) prefetch hardware based on the data stream parameters determined in block 506. In one embodiment, compiler 500 modifies prefetch hardware by inserting instructions that, when executed by a processor, modify the prefetch configuration of the processor. In this embodiment, the modification of prefetch hardware contemplated in block 508 assumes the presence of computer hardware that supports instructions that modify the prefetch configuration of the processor.

Referring to FIG. 6, a representative computer executable instruction suitable for achieving the data prefetching configuration described herein is presented. In the depicted example, data prefetch configuration is achieved using a modified form of an existing instruction, namely, a data cache block touch (DCBT) instruction. The conventional DCBT instruction is designed to cause the memory subsystem to fetch a cache line from memory and place in the cache having lowest latency. The DCBT instruction 600 depicted in FIG. 6 according to an embodiment of the present invention, includes fields for defining parameters associated with a data stream. Specifically, the depicted DCBT instruction 600 includes a start field 602 containing the address of the first line in a data stream and a direction field 604 defining the direction of the data stream. Direction field 604 is a single bit field indicating whether the data stream is increasing or decreasing. A stream identification field 610 identifies the data stream being configured. The invention includes the functionality to maintain and configure multiple data streams individually. In one embodiment, stream identification field 610 is a 4-bit field capable of specifying up to 16 data streams. The length field 606 indicates the data stream's ending cache line in relative terms while the depth field 608 specifies the aggressiveness of prefetching for the corresponding data stream.

The precise format of DCBT instruction 600 is an implementation detail. Compiler 500 of FIG. 5 and processor 102 of FIG. 1 both support DCBT instruction 600 as a mechanism to define and configure prefetching for individual data streams. In the event that object code is created for processor 102 using a compiler that is not enabled to identify data streams, processor 102 will operate using a default depth (see register 407 of FIG. 4) for each of the data streams that are automatically detected by the prefetch engine using its stream detection logic. In other embodiments, compiler 500 may, in addition to or in lieu of, configuring prefetching for individual data streams, modify the default depth for all data streams by modifying default depth 407. Although the depicted embodiment employs a modified form of the DCBT instruction to implement prefetching configuration, other embodiments may use other instructions or dedicated instructions for controlling the prefetch configuration hardware in a processor.

Figure 7:
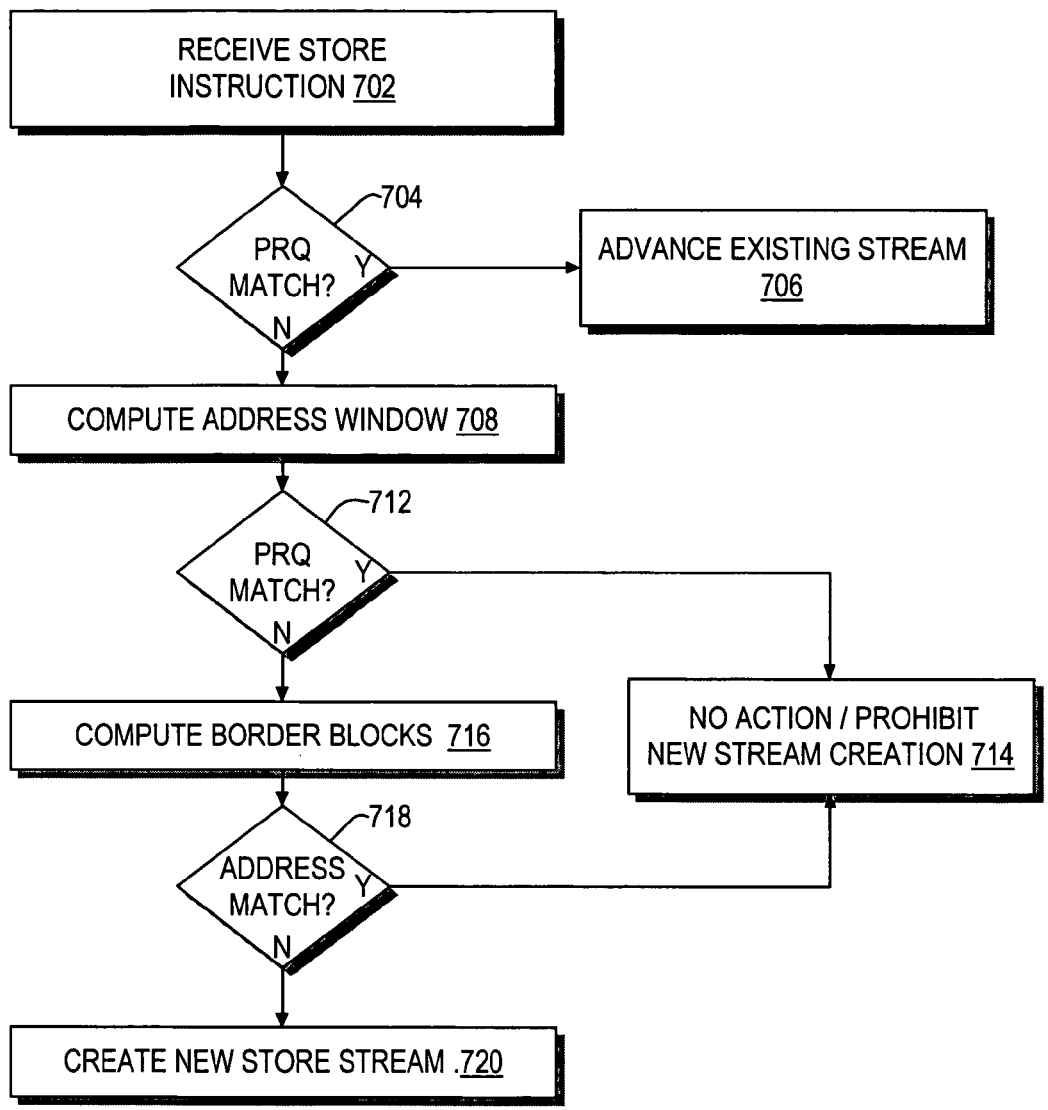
FIG. 7 is a flow diagram illustrating a method of allocating prefetch requests for store instructions according to one embodiment of the invention.
Figure 8:
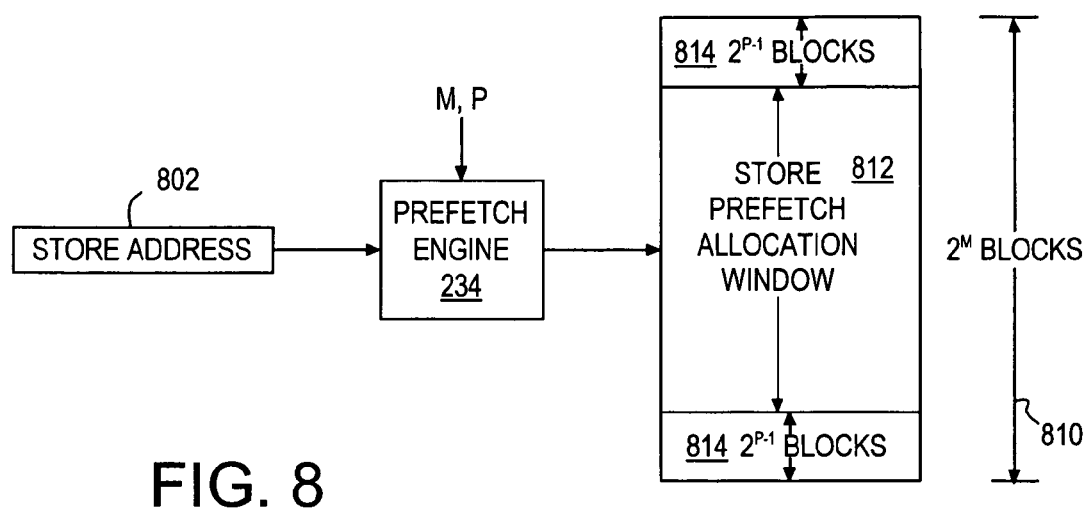
FIG. 8 illustrates a store prefetch allocation window used in the flow diagram of FIG. 7.

Referring now to FIG. 7 and FIG. 8, diagrams depicting the implementation of prefetching for store instructions are presented to emphasize unique aspects of the store prefetch mechanism in one embodiment of processor 102. In the depicted embodiment of the memory subsystem of processor 102, the L1 cache 208 is write-through and inclusive with the L2 cache 108, which requires that any updates to cache lines in the L1 cache 208 also immediately update the L2 cache 108 and further that all cache lines which are valid in the L1 cache also be valid in the L2 cache. When a store instruction executes, the data are written through to the L2 cache. If the cache line containing the address that is the target of a store instruction is not present in the L1 cache when the store data are available to be written, the processor writes the data through to the L2 cache and does not establish this cache line in the L1 cache. In this way, the absence of the cache line in the L1 cache in inconsequential for store processing, and therefore there is no need for a store miss queue. This behavior is referred to as a non-allocating store policy with respect to the L1 cache, which has been found to be advantageous to performance for a number of important programs.

The present invention contemplates a technique for detecting streams cost effectively. In the present embodiment, this technique is employed specifically to detect store streams. A store stream is defined as any sequence of storage accesses that store into a contiguous set of cache lines in a monotonically increasing or decreasing manner. In general, the process of executing stores does not require the cache line that contains the address to which the data are being stored to be available before the store instruction finishes execution. The cache line is required to be available only after the store executes and the processor produces the data. Even after the data are produced by a store, the data to be stored are often buffered in a queue until a later time when the store updates memory. In a cache-based processor, the store updates a portion of a cache line, and therefore the cache line must be available at the time of the update. The process of reading a cache line, modifying or updating the cache line with the data produced by the store instruction, and then finally writing the cache line to memory is called a read-modify-write operation, or RMW. The buffering and post-execution updating of the cache line associated with the store data provides a measure of latency tolerance for store instructions that does not exist for load instructions. For this reason, store prefetching has in the past not been a performance requirement for processor and system design. However, with the growing latency of accessing non-local storage, especially DRAM memory, the latency associated with the RMW operation has surpassed the limited buffering that is practical for store instructions in certain designs.

As described above, load prefetching streams in the present embodiment are allocated based on two hardware queues, namely, the LMQ 207 and the PRQ 235. The LMQ 207 contains the addresses of requested cache lines that have missed the L1 cache while the PRQ 235 contains the address of the next cache line in the data stream. LMQ 207 is an expensive structure primarily because each of its entries must be compared against every load or store address generated each cycle. It receives a miss indication from the L1 cache directory when an address is not in its directory and allocates a new entry if the load address is not already represented in any of its entries. While it is possible to construct a comparable queue for L2 cache store misses for purposes of facilitating store prefetch processing, the present invention recognizes that the cost and complexity associated with doing so makes this approach unattractive.

Instead of relying on a miss queue as load prefetching does, the store prefetch mechanism of the present invention relies exclusively on the existing PRQ 235 and the address generated by LSU 200. Referring to FIG. 7 and FIG. 8, a method 700 of identifying and allocating store prefetch streams according to an embodiment of the present invention is depicted. When an address of a store instruction is received (block 702) by the prefetch hardware 210, the address is compared (block 704) to the existing entries in PRQ 235. If a match with the address is found in an entry of PRQ 235, the corresponding prefetch stream is serviced 706 as described above.

If the received address does not match any entry in PRQ 235, prefetch engine 234 must determine whether to allocate a new stream for the received store instruction. To do this, prefetch engine 234 first computes (block 708) an address window 810 based on the received cache line address and the parameter M. Address window 810 is a set of $2^M$ contiguous cache line addresses where the base address of window 810 is determined by setting the low order M bits of the received address to 0 and the high address in window 810 is equal to the received address with its low order M bits set to 1. As an example, for a cache line address of 0xAE6333 and M=4, address window 810 extends from 0xAE6330 to 0xAE633F. In the preferred embodiment, address window 810 encompasses at least four (M=2) cache line addresses (including the current address).

Entries in PRQ 235 are then compared (block 712) against address window 810 (i.e., does any entry in PRQ 235 fall within address window 810). If any entry in PRQ 235 matches with address window 810, prefetch engine 234 suppresses the creation of a new stream (block 714). This technique effectively permits only one data stream within a multi-line window. It prevents redundant store streams from being created within the window as both the current line and the guessed next line in the stream are both covered by the window, provided the current line and guessed next line (in the PRQ) do not straddle two adjacent windows. To handle the situation where the current line and guessed next line straddle adjacent windows, a border zone, which prohibits new stream allocations, is implemented. The prefetch engine 234 determines (block 716) the addresses of a set of border lines 814 to the window based on the received address and the parameters P and M. In the depicted embodiment, the border lines 814 are the $2^{(p-1)}$ addresses at either boundary of address window 810. For the exemplary address window 810 referred to above where P=2, the border line addresses are 0xAE6330, 0xAE6331, 0xAE633E, and 0xAE633F. Prefetch engine 234 would prohibit a received address equal to any of these border line addresses from creating a new stream in PRQ 235, regardless of what entries are stored in PRQ 235. This logic prevents multiple store streams from being instantiated when the stream begins in the border region. If (block 718) the received address does not match any of the border line addresses, a new store stream is created (block 720).

Note that the prefetch allocation policy for stores streams is more conservative than for load streams because it may require store instructions to more than two consecutive lines to establish a store stream depending on where the store stream starts within window 810. In many applications, however, this is not detrimental to performance since the store buffering that is available can allow processing to continue until a store stream is established and prefetches are requested.

Note also that allocating prefetches based on the window 810 without information as to whether the prefetch cache lines are already in the L2 cache may result in some superfluous prefetches. In this embodiment, store streams do not produce L1 prefetches, consistent with the no-allocate-on-store policy of the processor, so there are never any superfluous L1 prefetches. Store prefetches that hit in the L2 cache are simply dropped. With this method, a store stream that resides entirely within the L2 cache will still consume a stream register in the PRQ 235 and will send superfluous prefetches to the L2, consuming both PRQ resource and prefetch signaling bandwidth. However, given that the ratio of store streams to load streams is typically small in most applications, this is considered to be an acceptable trade-off considering the simplicity of the design compared with a design that would required timely L2 hit information.

Once a store stream is created, the mechanics of advancing a store stream are the same as those of a load stream and can utilize the prefetch configuration hardware described above to control prefetch depth and so forth.

In one embodiment, however, load streams include L1 prefetches and L2 prefetches whereas, in the case of stores, only the L2 prefetches are issued. By excluding L1 prefetches for stores, bandwidth resources between the L2 and L1 caches are conserved as well as cache entries in the L1 cache for data that are stored only, consistent with the design philosophy of a no-allocate-on-store write-through cache as described in this embodiment. If the same stream is loaded and then stored, the load stream will have preference and will be retained at the expense of the store stream no matter the order in which they were created. This ensures that the data will be prefetched into the L1 cache, where it is available for use by the load instruction.

Store analogies of the load DCBT instructions described above in FIG. 6 are available to a compiler to define and modify the configuration of store streams. These instructions are useful for store streams as well as for situations in which the LMQ or the L1 prefetch interface would be the limiting resource. In these situations, the store variant of DCBT is ideally suited to maximize performance. For example, the store variant of DCBT can be used to prefetch a group of short streams into the L2 cache while simultaneously prefetching other streams into the L1 cache.

It will be apparent to those skilled in the art having the benefit of this disclosure that the present invention contemplates a method and system for stream-based prefetching and for special handling of store stream prefetching. It is understood that the form of the invention shown and described in the detailed description and the drawings are to be taken merely as examples. It is intended that the following claims be interpreted broadly to embrace all variations of the embodiments disclosed.

What is claimed is:

1. A method of prefetching data in a microprocessor, comprising:
    identifying a data stream associated with a program, wherein the data stream comprises a sequence of memory addresses that reference two or more contiguous cache lines;
    determining a depth associated with the data stream based upon prefetch factors including the number of concurrent data streams and data consumption rates associated with the concurrent data streams; and
    generating data prefetch requests associated with the data stream to reflect the determined depth of the data stream.

2. The method of claim 1, wherein generating data prefetch requests includes generating prefetch requests for a number of cache lines adjacent and contiguous to a cache line currently being referenced by the program, wherein the number of cache lines is equal to the determined depth.

3. The method of claim 1, further comprising, responsive to determining the depth associated with a data stream, configuring prefetch hardware to reflect the determined depth for the identified data stream.

4. The method of claim 3, wherein configuring the prefetch hardware is controlled by prefetch control bits in an instruction executed by the processor.

5. The method of claim 4, wherein the prefetch control bits include a field of bits indicative of a depth associated with the data stream and an indicator of the number of bytes in the data stream.

6. The method of claim 1, wherein determining the depth associated with the data stream comprises determining a programmable default depth, wherein the default depth is applicable to a data stream unless the data stream explicitly overrides the default depth.

7. The method of claim 6, further comprising altering the default depth wherein the altered default depth applies to all subsequent streams referring to the default depth.

* * * * *